United States Patent [19]

Yeager et al.

[11] 4,165,697

[45] Aug. 28, 1979

[54] HAND OPERATED SEED PLANTER

[75] Inventors: Robert R. Yeager, Union City; Ronald E. Shaner, Rossburg, both of Ohio

[73] Assignee: Lambert Corporation, Dayton, Ohio

[21] Appl. No.: 910,456

[22] Filed: May 30, 1978

Related U.S. Application Data

[63] Continuation-in-part of Ser. No. 826,646, Aug. 22, 1977, abandoned.

[51] Int. Cl.² .............................................. A01C 5/02
[52] U.S. Cl. ................................................... 111/92
[58] Field of Search .......................... 111/1, 4, 7.1, 7.2, 111/7.3, 7.4, 89, 90, 91, 92, 93, 94, 95, 96, 97, 98, 99

[56] References Cited

U.S. PATENT DOCUMENTS

| 15,616 | 8/1856 | Martratt | 111/96 |
| 182,367 | 9/1876 | Jones | 111/4 |
| 1,314,546 | 9/1919 | Stratton | 111/95 |
| 1,456,921 | 5/1923 | Elliott | 111/4 |
| 1,778,701 | 10/1930 | Williams | 111/4 |
| 2,800,865 | 7/1957 | Gathercoal | 111/7.1 |
| 2,865,314 | 12/1958 | Landin et al. | 111/92 |
| 3,010,609 | 11/1961 | Jolly | 221/254 |

FOREIGN PATENT DOCUMENTS

| 189828 | 5/1957 | Austria | 111/98 |
| 205786 | 10/1959 | Austria | 111/96 |
| 531383 | 7/1931 | Fed. Rep. of Germany | 111/89 |
| 316083 | 9/1956 | Switzerland | 111/95 |
| 1094411 | 12/1967 | United Kingdom | 111/89 |

*Primary Examiner*—Edgar S. Burr
*Assistant Examiner*—James R. Feyrer
*Attorney, Agent, or Firm*—Biebel, French & Nauman

[57] ABSTRACT

A hand held seed planter includes a tubular body and a pair of ground-opening jaws pivotally carried on one end of the body. A seed hopper is slidably mounted on the other end of the body and a ground engaging collar is carried on the one end, surrounding the jaws and mounted for sliding movement on the tubular body. When the soil collar is placed on the ground and a downward force applied to the handle attached to the hopper, the jaws are moved downward into the soil and create a seed opening in the soil. Adjustable pins on the collar control the depth of the opening. At the same time, a seed scoop recess, carrying a seed, is brought into alignment with an opening in a tube which extends through the hopper. A seed is then transferred into the tube, passing through the tubular body and between the jaws, to be planted in the seed opening.

In one embodiment of the invention, the jaws are operated by upward movement of the soil collar, while in another embodiment, the jaws are operated by rollers carried on an internal jaw actuating tube which contacts cams formed in the inside surfaces of the jaws.

12 Claims, 9 Drawing Figures

HAND OPERATED SEED PLANTER

RELATED APPLICATIONS

This application is a continuation-in-part of U.S. patent application Ser. No. 826,646, filed Aug. 22, 1977, now abandoned.

BACKGROUND OF THE INVENTION

The present invention relates to planting devices and, more particularly, to hand-held seed planters for rapidly planting seeds of different size at predetermined depths below the surface of the soil.

Seed planters, sometimes termed seed drills, have been used for mechanized planting operations on farms and other relatively large scale agricultural developments. Few alternatives to such seed drills have been available for use in gardens; typically such planting has been done by hand. This is a slow, tiring process and requires a great deal of bending and stooping.

One known hand-held planting device includes a pair of ground engaging members which are hinged together and which have handles at their upper ends. A pair of flexible partitions extend between the hinged members and a seed hopper is mounted outwardly on one of the hinged members. The members have a pair of blades at their lower ends which open as the members are pivoted and which are used to form a seed hole in the ground. As the members are pivoted outwardly, a small scoop mechanism drops one of the seeds from the seed hopper into the space between the members and the flexible partitions and the seed falls downwardly into the hole which is opened in the soil by the blades. This prior art device required both a downward motion and an outward pivoting of the handles in order to create the opening in the soil and to plant the seed therein. This motion is somewhat tiring, and further, requires the use of both hands. Additionally, the scoop mechanism which is used to drop seeds into the soil was of fixed size and, therefore, did not work well with seeds of varying size. This device also tended to be relatively heavy and thus tiresome to operate.

It is seen that a need exists, therefore, to provide a hand-held seed planting device which is light, which requires only a downward force on its upper end to plant a seed, and further, which may be used with seeds of various sizes.

SUMMARY OF THE INVENTION

In one embodiment of the invention, a hand operated seed planting device includes a vertically oriented tubular body, a pair of soil spreading jaws pivotally mounted on the lower end of the tubular body, and a soil collar slidably mounted on the tubular body at its lower end. The jaws are positioned to extend through the soil collar and into the ground at one axial end of the soil collar with sliding movement of the collar on the body. Means coact between the soil collar and the jaws to engage the jaws and cause the jaws to be spread apart concurrently with the downward movement of the tubular body with respect to the collar. A hopper means is carried on the upper end of the tubular body and includes metering means for dropping single seeds through the tubular body from the hopper concurrently with the operating movement of the jaws.

The metering or dispensing means for dropping a single seed through the tubular body includes a tube forming an extension of a handle on the hopper, which tube extends through the hopper and opens at its lower end into the body. Means in the tube define a seed-receiving opening and a seed scoop means is mounted on the upper end of the body in the interior of the hopper and opening upwardly into the hopper to receive a seed therefrom. The hopper is movable along the tube to bring the seed scoop means in registration with the opening in the tube. A seed will therefore be discharged through the opening into the tube for delivery to the body. The scoop means defines a plurality of seed-receiving recesses of differing sizes for handling seeds, and means for selectively aligning the tube opening with one of the recesses.

The means on the jaws which coact with the collar may include outwardly extending lever portions with the collar including adjustable means for contacting the lever portions, causing the jaws to pivot outwardly from each other as the tubular body is moved with respect to the collar. The lever portions may be positioned in axially extending slots in the collar and the adjustable means for contacting the lever portions may include adjustable means positioned to extend across said slots to block movement of said lever portions therepast.

In another embodiment of the invention, the jaws are operated by an internal force applied thereto, by means of an intermediate jaw actuator which carries thereon rollers which coact with cam surfaces formed on the inside of the jaws. The jaws actuator tube is, in turn, operated by contact with the seed delivery tube, and the seed falls through the delivery tube and through the actuator tube into the said pocket prepared by the jaws.

Accordingly, it is an object of the present invention to provide a manually operable seed planting device which may be operated by pushing the device downward in contact with the soil; to provide such a device designed for single hand operation; to provide such a device in which a plurality of seed sizes may be accommodated; and, to provide such a device in which the depth at which the seeds are planted may be adjusted.

DETAILED DESCRIPTION OF THE PREFERRED EMBODIMENTS

Figure 1:
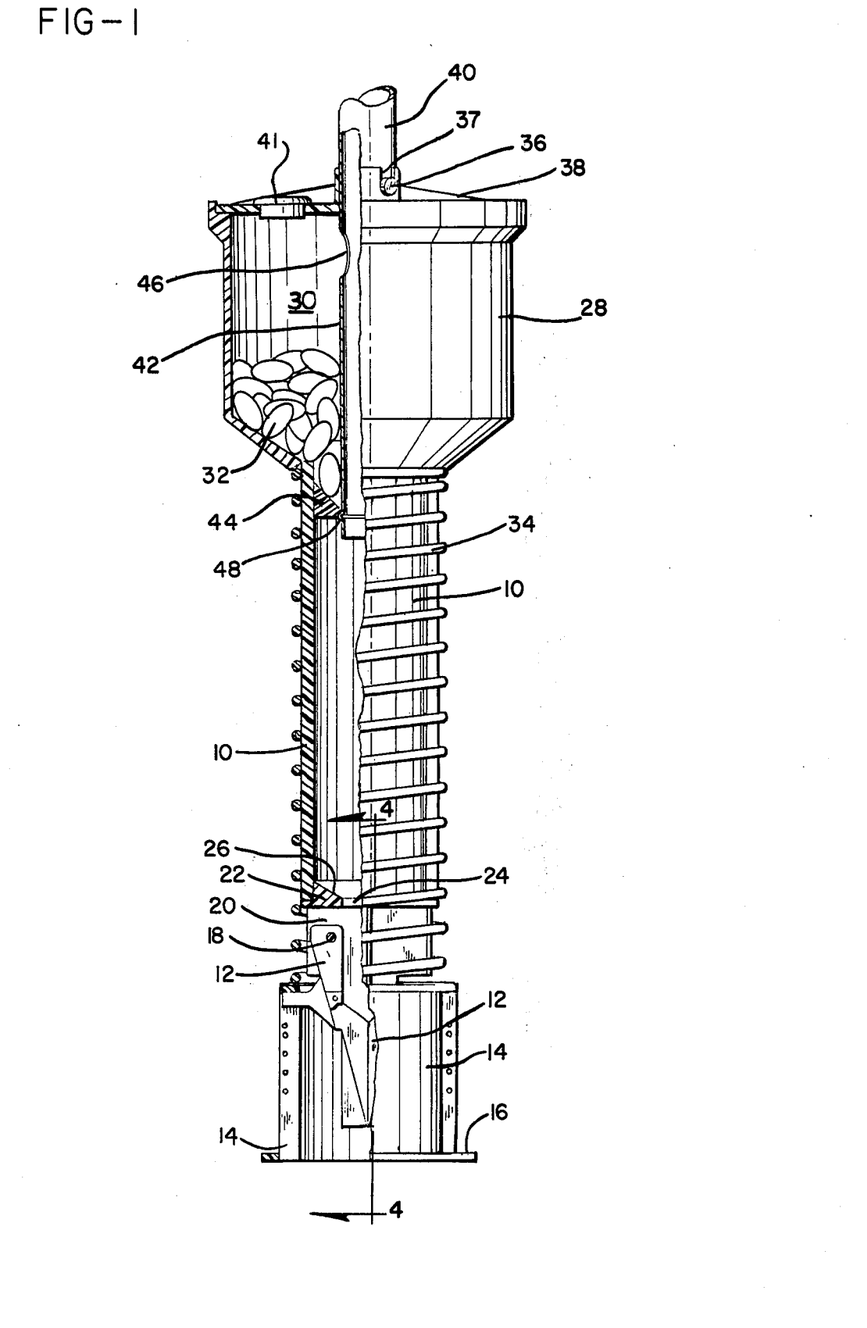
FIG. 1 is a side view of the planting device of the present invention with portions broken away and in section.
Figure 2:
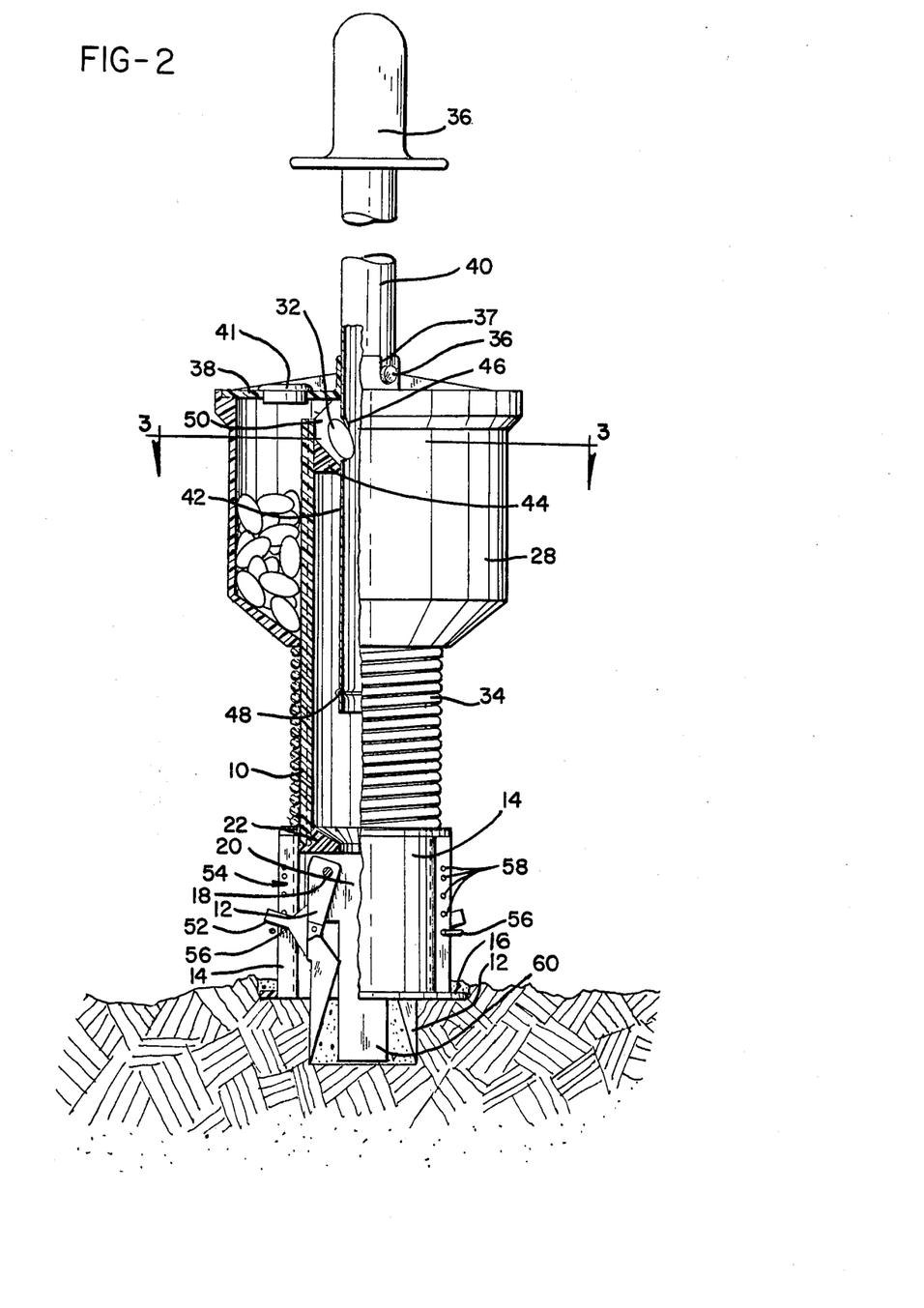
FIG. 2 is a view, similar to FIG. 1, showing the relative position of component parts during a planting operation.

Reference is now made to FIGS. 1-5 and more particularly to FIGS. 1 and 2, in which a first embodiment of the hand operated seed planting device of the present invention is shown prior to and during implantation of a seed, respectively. A vertically oriented tubular body 10 has a pair of soil spreading jaws 12 pivotally mounted on the lower end of the body 10 and a soil collar 14 slidably mounted on the body 10 at its lower end. Collar 14 includes a soil engaging flange 16 which contacts the soil and prevents the collar 14 from being pushed below the surface of the soil during the planting operation. Jaws 12 are mounted by pivot pins 18 to jaw plates 20. Plates 20 are formed unitarily with a cylindrical element 22 which is mounted at the lower end of tubular body 10 and which defines circular opening 24 therein. The upper surface 26 of element 22 is inclined downwardly toward opening 24, as illustrated.

A seed hopper means, including a hopper 28, is carried on the upper end of the tubular body 10 and provides a seed storage cavity 30 for storing seeds 32. The hopper 28 may slide downwardly with respect to the tubular body 10 against the biasing force of spring 34. Similarly, collar 14 may slide upwardly with respect to the tubular body 10 against the biasing force of spring 34. The hopper 28 includes a seed dispenser means or metering means for dropping seeds through the tubular body 10 from the hopper 28 during the planting operation. A spring button 36 engages one of several slots 37 in lid 38 and prevents hopper 28 from sliding up handle 40. Plug 41 closes an opening in lid 38 through which hopper 28 may be filled with seeds. A tube 42 forms an extension of handle 40 and extends through the hopper 28, opening at its lower end into the body 10. The lower portion of the hopper 28 is closed to the interior of body 10 by a seed scoop means 44, the operation of which is described below.

Tube 42 defines a seed receiving opening 46 therethrough. Seed scoop means 44 surrounds the tube 42 and contacts the circumferential rib 48 formed in tube 42. Rib 48 acts as a stop to prevent the hopper 28 and associated structure from sliding further upwardly on tubular body 10 under the bias of spring 34.

FIG. 2 illustrates the relative movement of parts of the planting device during the planting operation. A downward force is applied to handle 40 by the operator and the hopper 28 and associated structure will be moved downwardly along tubular body 10; at the same time, the tubular body 10 will be moved downwardly with respect to the soil collar 14. As the hopper 28 moves downwardly, the seed scoop means 44 will be moved upwardly with respect to the tube 42 until the seed receiving recess 50 in the scoop means 44 is in registration with the opening 46. When this occurs, the seed 32, carried in the recess 50, will pass through opening 46, down tube 42 and into body 10.

At the same time that a seed is dropped into the body 10, the jaws 12 will be inserted into the soil. Each of the jaws 12 includes a lever portion 52 which coacts with an adjustable means contacting the lever portions 52 to cause the jaws to pivot outwardly from each other into the open position shown in FIG. 2. This outward pivoting action of the jaws after they are inserted into the soil will result in the creation of a seed planting opening in the soil.

The ground engaging collar 14 defines axially extending slots 54 in which the lever portions 52 move and in which pins 56 may be positioned. The pins 56 will be inserted in openings 58 such that they extend across the slots 54 at one of a plurality of positions along the slots to block the movement of the lever portions 52 therepast. As the lever portions 52 strike pins 56, the jaws 12 will be open outwardly and thereafter they will be prevented from going deeper into the soil. The depth at which a seed 32 is planted, therefore, is adjusted in the present invention by inserting the pins 56 into the appropriate holes 58.

Figure 3:
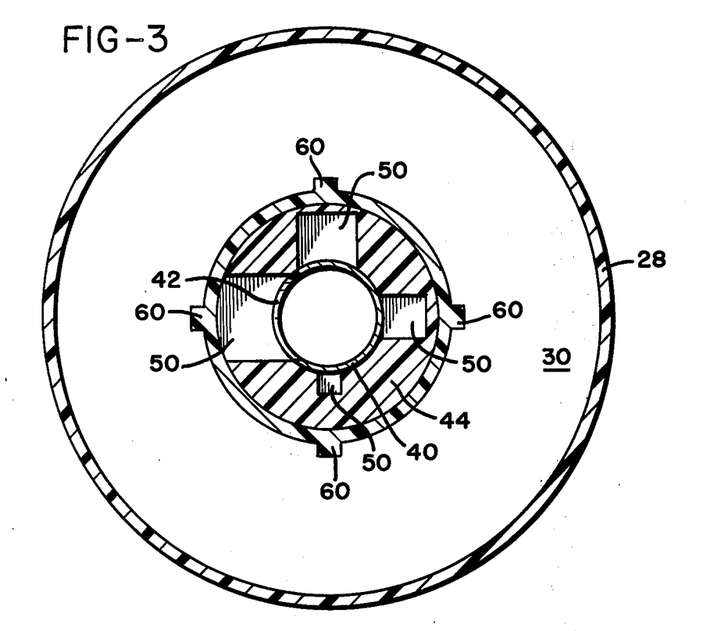
FIG. 3 is a sectional view taken generally along the line 3—3 in FIG. 2.

Reference is now made to FIG. 3 in which the hopper 28 and the seed scoop means 44 are shown in greater detail. The bottom of hopper 28 surrounds body 10 and defines a plurality of notch engaging splines 60 which extend axially along the surface of tubular body 10. Splines 60 prevent rotation between body 10 and the hopper 28. The scoop means 44 includes a plurality of seed receiving recesses 50 of varying size. The tube 42 may be rotated with respect to the scoop means 44 by pushing the hopper 28 downwardly and disengaging spring button 36 (FIG. 1) from one of slots 37 in the lid 38 of the hopper 28. The tube 42 is then rotated until the opening 46 is aligned with the desired seed receiving recess. Four slots 37 are provided in the upper portion of the lid 38 for engaging the spring button 36 in the four desired positions.

Figure 4:
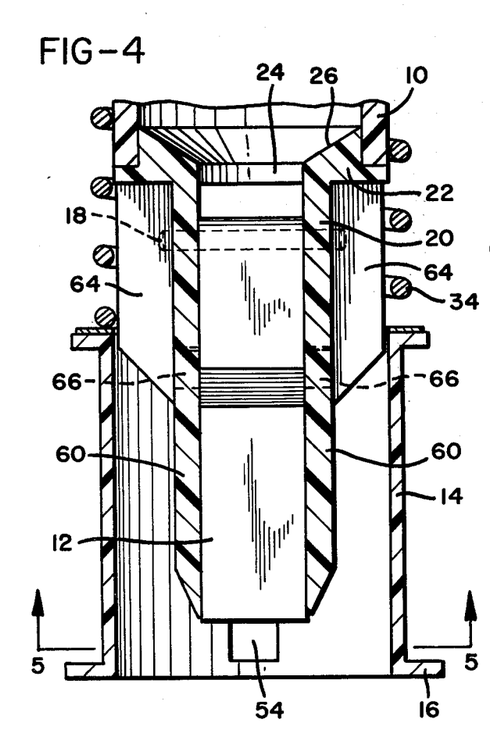
FIG. 4 is a sectional view of the lower portion of the device taken generally along the line 4—4 in FIG. 1.
Figure 5:
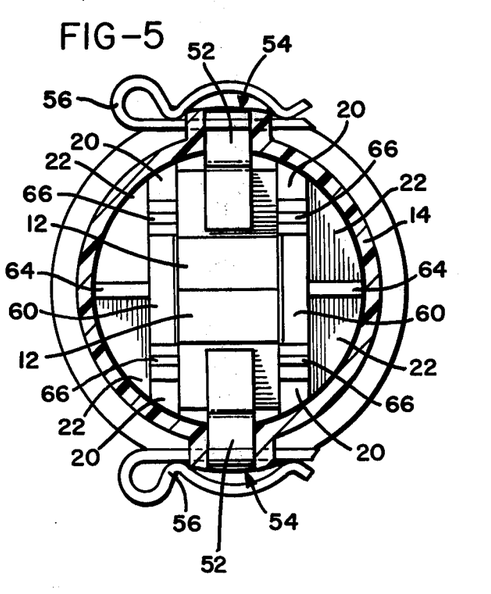
FIG. 5 is a sectional view taken generally along the line 5—5 of FIG. 4.

Referring to FIGS. 4 and 5, the details of the jaw mechanism are shown in somewhat greater detail. Side jaw elements 62 extend downward from jaw plates 20 and assist the jaws 12 in creating the seed opening in the soil. As the jaw 12 are pivoted away from each other in the soil, the side jaw elements 62 will prevent the soil from filling back in between the jaws. Side jaw elements 62 include rib portions 64 which help align the lower end of body 10 within the soil collar 14. The seed which has been dispensed from the hopper 28 will pass down through body 10, through opening 24 and between jaws 12.

Reference is now made to FIG. 5 showing the jaw mechanism of the invention as seen looking upward generally along line 5—5. Tabs 66 extend outwardly from the jaws 12 and ride along the edges of the jaw side elements 62. Tabs 66 provide positional stability for the jaws 12, preventing the jaws from pivoting excessively prior to insertion into the soil. Pins 56 are shown in one form but it should be appreciated that any type of pin which may be inserted through the openings 58 across slots 54 may be used to block the movement of the lever portions 52.

Most of the component elements of the present invention will advantageously be molded from a plastic material. It will be particularly advantageous to form the hopper 28 of clear plastic so that the level of the seeds in the hopper can be checked without opening the hopper.

FIGS. 6-9 illustrate an embodiment of the invention in which all of the springs are contained internally within the planter, and in which the planter insertion jaws are operated by a force applied internally to the jaws along cam surfaces thereon.

The generally tubular body or housing 100 has an annular seed scoop or retainer 102 mounted on its upper end substantially in the manner of the scoop means 44 of the embodiment of FIGS. 1-5, with pockets or recesses to capture and retain a seed from the hopper 104. The hopper 104 is slidably mounted on the outer surface of the tubular body 100, and is operatively associated with and mounted on a hollow seed delivery handle or tube 105, corresponding generally to the tube 42 of the embodiment of FIGS. 1–5. It is thus understood that the tube 105 has an opening means adjacent a region near the top of the hopper for receiving a seed from retainer 102. The hopper 104 and the associated handle and seed delivery tube 105 are retained in the elevated position by a coil spring 110 received and retained within the interior of the body 100. The upper end of the spring 110 bears against a washer 111 received against a collar 112 formed on the lower end of the tube 105, while the lower end bears against a closure wall 113 formed in the body 100.

The lower end of the tube body 100 slidably supports a ground engaging collar 115. The collar 115 has a lower flared end or flange 116 for engaging the ground and is formed with slotted openings 117 formed in the side thereof, corresponding substantially to the slotted openings 54 of the embodiment of FIGS. 1–5. The lower end of the body 100 has integrally formed thereon a pair of transversely spaced, downwardly depending side jaw elements 118. The side jaw elements 118 correspond substantially to the elements 62 of the preceding embodiment. They are normally received wholly within the soil collar 115 and have lower ends 119 which are selectively exposed depending upon the permitted upward movement of the collar 115.

The collar is maintained in a normally lowered position by a relatively light coil spring 120 received therein. The upper end of the coil spring 120 bears against a retainer ring 121 carried on the body 100, and the lower end thereof bears against an annular internal shoulder portion 122 of the coliar 115.

Figure 8:
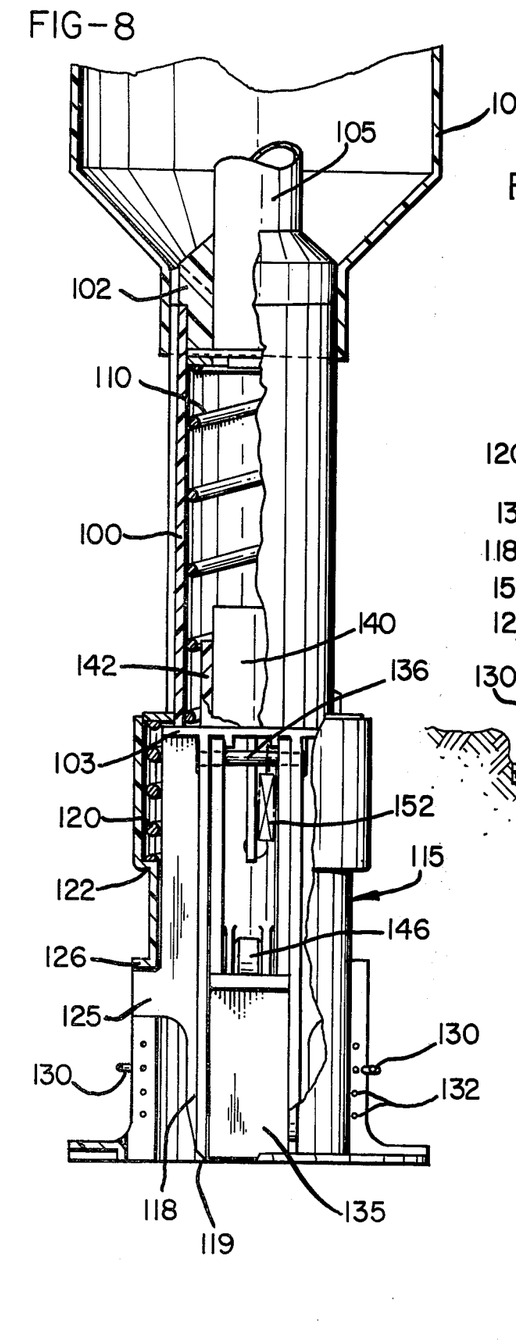
FIG. 8 is a partially broken away view of the planter of FIG. 6 as viewed along the reference line 8—8 of FIG. 6.

The side jaw elements are provided with outwardly extending tabs 125 which extend into the slotted openings 117, and the "at rest" or lowered position of the collar 115 is shown in FIG. 8 in which each tab 125 rests against an upper ledge 126 formed on the collar. The depth of penetration of the seeder into the ground is selectively adjustable by positioning clips or pins 130, corresponding to the pins 56 previously described, in any one of a plurality of transversely oriented, vertically spaced openings 132 formed in the lower end of the collar. Relative upward movement of the collar 115 results in the engagement of the tabs 125 with an associated pin 130, as illustrated in FIG. 9, and the plurality of the openings 132 permit selection of the planting depth by defining the extent of relative vertical movement of the collar 115.

Figures 6, 7:
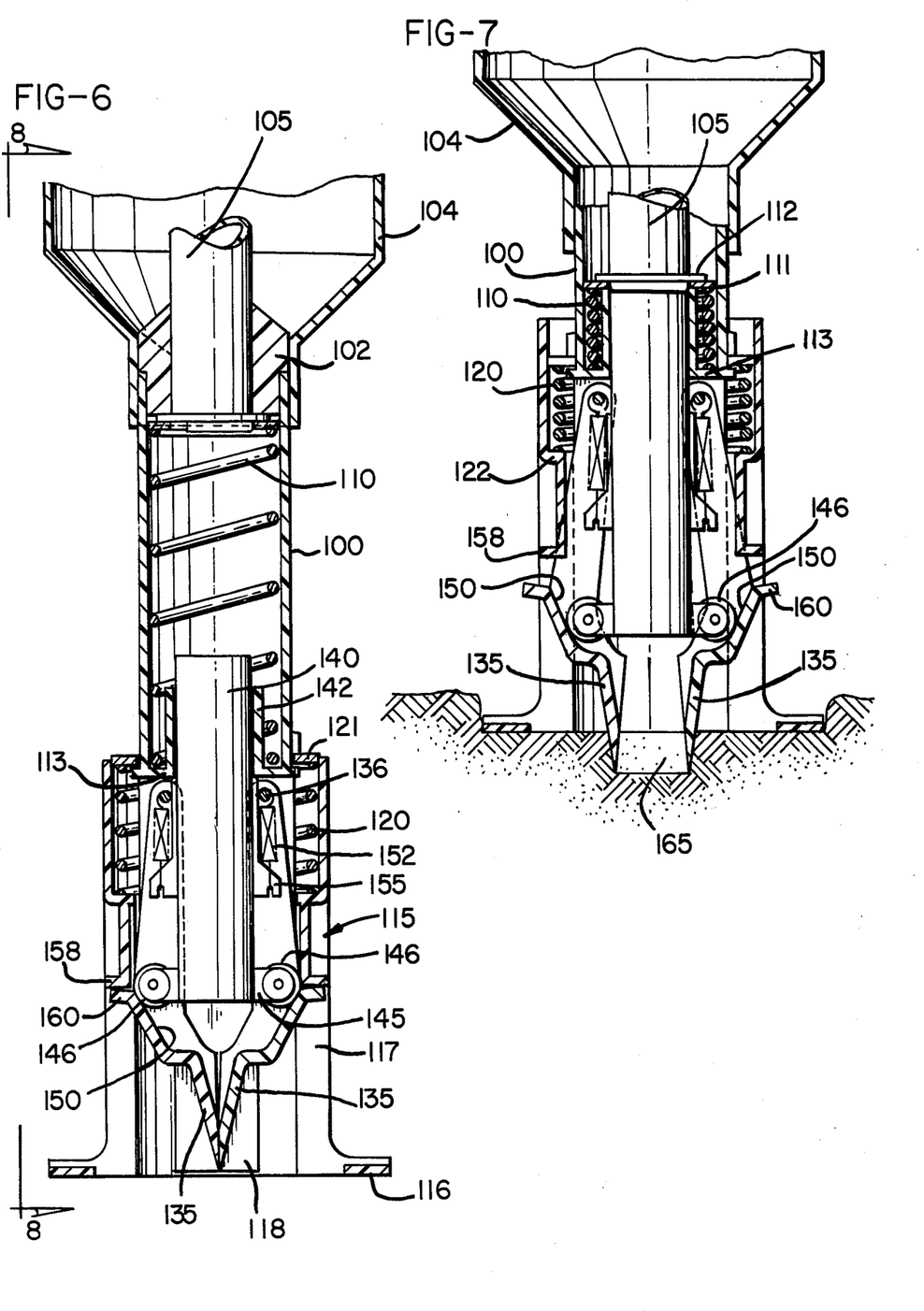
FIG. 6 is a vertical fragmentary section, with certain parts in elevation, of a modified form of the invention.
FIG. 7 is a section of the lower portion of the modified form of the invention as viewed in FIG. 6, but with the parts in a moved position as during the planting of a seed.

As in the preceding embodiment, a pair of identical soil spreading jaws 135 are pivotally mounted on the body 100, between the flat inside surfaces of the elements 118, on transversely oriented pins 136. Internal means for operating the jaws 135 in a spreading action includes a jaw actuator tube 140 which is slidably mounted within an internal upwardly extending sleeve 142 formed in the lower end of the body 100. The tube 140 has an upper end which normally extends a short distance above the upper end of the sleeve 142 in the retracted position of the tube 140, as shown in FIG. 6. The tube 140 extends downwardly and terminates at its lower end at a transverse yoke 145. The yoke 145 supports a pair of rollers 146. The rollers 146 coact with inwardly tapering opposed cam surfaces 150 formed on the inside of the jaws 135, and the tube 140 is retained in an elevated position by retraction springs 152. The springs 152 have lower ends engaged with tabs 155 formed on the outer wall of the tube 140 and the upper ends of the springs are looped over the pivot pins 136, as shown in FIGS. 6 and 7. The jaws themselves are urged into a closed position by ledges 158 (FIG. 6) formed on the collar which coact with outwardly extending tabs 160 formed on the outer surface of each of jaws 135.

Figure 9:
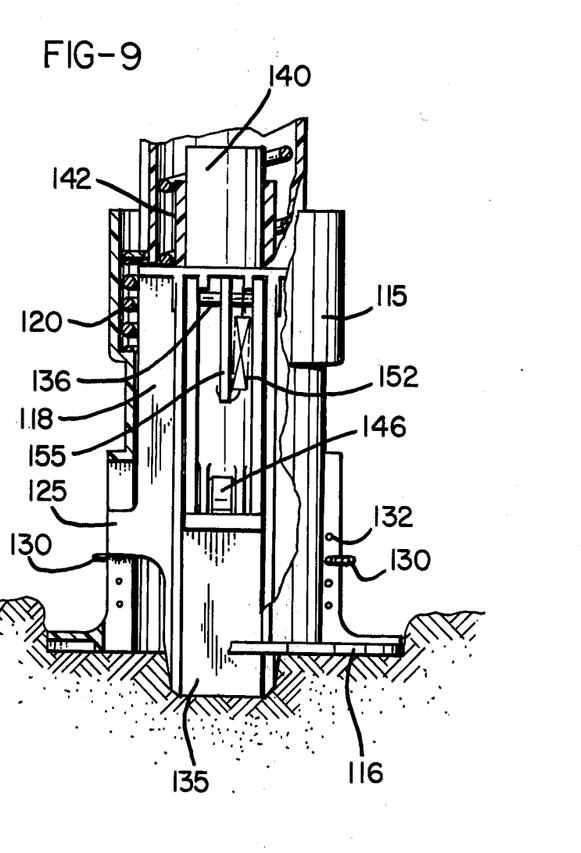
FIG. 9 is a partially broken away view of the parts comprising the lower portion of the planter as viewed in FIG. 8, but showing these parts in the planting position corresponding to FIG. 7.

In the operation of the embodiment of the planter of FIGS. 6–9, a downward force on the handle exerts a downward force on the soil collar 115 resulting in penetration of the underlying soil by the closed jaws 135 and by the fixed side members 118, as shown in FIG. 9. Since the spring 120 has a lighter force than the spring 110, the collar 115 moves relatively upwardly against the force of the spring 120 until the tabs 125 come into contact with the pins 130 as shown in FIG. 9, thus inserting the jaws 135 and side members 118 a preselected depth into the soil. Continued downward force on the handle moves the tube 105 downwardly through the seed scoop 102 until the lower end of the tube 105 comes into physical contact with the exposed upper end of the jaw actuating tube 140. Continued downward movement of the tube 105 causes a transfer of this motion to the jaw actuating tube 140, moving the actuator tube 140 to the position shown in FIG. 7. The rollers 146 coact with the inside cam surfaces 150 causing the jaws to be spread apart as shown in FIG. 7, opening a pocket or recess 165 within the soil. Since the tubes 105 and 140 are hollow, they are now effectively in communication with each other, and the seed which is displaced by the downward movement into the interior of the tube 105, as described above in connection with the preceding embodiment, now freely drops through this tube and through the hollow jaw actuator tube 140 and into the soil pocket 165.

When the downward force is released, the tubular body 100 returns to its original position as shown in FIGS. 6 and 8, and the handle tube 105 is thus retracted by the spring 110 to its rest position, and the jaw actuator tube 140 is free to rise under the influence of its retraction springs 152. When the seed planter is lifted from the ground, the collar 115 returns to its lowered position, and the collar ledges 158 engage the outwardly extending tabs 160 formed on the jaws 135, returning the jaws to their closed position as shown in FIG. 6.

While the forms of apparatus herein described constitute preferred embodiments of this invention, it is to be understood that the invention is not limited to these precise forms of apparatus, and that changes may be made therein without departing from the scope of the invention.

What is claimed is:

1. A hand operated seed planting device comprising a vertically oriented tubular body, a pair of soil spreading jaws pivotally mounted on the lower end of said tubular body, a soil collar slidably mounted on said tubular body at the lower end thereof, said jaws being proportioned to extend through said soil collar and into the ground at one axial end of said soil collar upon sliding movement of said collar on said tubular body, means coacting between said soil collar and said jaws for engaging said jaws responsive to and concurrently with downward movement of said tubular body relative to said collar and for causing said jaws to be spread apart in the soil in response to said downward movement of said tubular body and thereby creating a seed receiving space in the ground, and hopper means carried on the upper end of said tubular body, including metering means for dropping a single seed through said tubular body from said hopper means concurrently with said jaw operating movement, thereby depositing said seed into the space in the ground opened between said jaws.

2. A hand operated seed planting device comprising a tubular body, a pair of ground-opening jaws pivotally carried on one end of said tubular body, a seed hopper slidably mounted on the other end of said tubular body, a ground-engaging collar carried on said one end of said tubular body in normally surrounding relation to said jaws and mounted for sliding movement relative to said tubular body, coil spring means carried on said tubular body and extending between said collar and said hopper, said collar being movable on said tubular body against the force of said spring means in response to ground contact thereto, means on said jaws coacting with said collar and urging said jaws to open in response to said collar movement, handle means on said hopper for applying a downward force on said seed hopper, and seed dispenser means in said hopper responsive to movement of said hopper on said tubular body against said spring source to dispense a single seed into the interior of said body for delivery by gravity through said body and into the space in the ground opened by said jaws.

3. The hand operated seed planting device of claim 2 in which said means on said jaws coating with said collar include outwardly extending lever portions and in which said collar includes adjustable means for contacting said lever portions to cause said jaws to pivot outwardly from each other, opening the ground for implantation of the seed.

4. The hand operated seed planting device of claim 3 in which said collar defines axially extending slots in which said lever portions of said jaws move and in which said adjustable means includes means for extending across said slots at a plurality of positions along said slots to block movement of said lever portions therepast.

5. The seed planting device of claim 2 in which said dispenser means in said hopper comprises a tube forming an extension of said handle and extending through said hopper and opening at its lower end into said tubular body, means in said tube defining a seed receiving opening therethrough, seed scoop means carried on the upper end of said tubular body in the interior of said hopper and in surrounding relation to said tube and opening upwardly into said hopper to receive a seed therefrom, said hopper being movable along said tube to bring said seed scoop means into registration with said opening in said tube thereby presenting a seed in said scoop means to be discharged through said opening into said tube for delivery into said tubular body.

6. The seed planting device of claim 2 in which said scoop means defines a plurality of seed receiving recesses of differing size for handling seeds, and means for selectively aligning said tube opening with one of said recesses.

7. A hand operated seed planting device, comprising a tubular body which is generally vertically oriented in use, a pair of soil spreading jaws pivotally mounted on a lower end of said body, a soil collar slidably mounted on said body at the lower end thereof in normally surrounding relation to said jaws and slidable thereon between a lowered position in which said jaws are received within said collar and an elevated position, said jaws being proportioned to extend through said collar into the ground at the lower end of said collar upon upward sliding movement of said collar on said body to said elevated position, means normally urging said collar to said lowered position, hopper means carried on the upper end of said body including a hopper for retaining a plurality of seeds and a depending tube carried on said hopper within said body, said hopper and said depending tube being slidably movable on said body between a normally raised position and a lowered position, spring means urging said hopper into said raised position, seed metering means cooperating between said hopper and said depending tube for dropping a seed through said tube from said hopper concurrently with movement of said hopper and said tube toward said lowered position, a jaw operating hollow member in said body at said lower end in generally axial alignment with said depending tube, said member having an upper end engageable with said tube when said hopper and tube are moved into the lowered position thereof, and movable thereby, and means on said member coacting with said jaws responsive to said lowering movement for causing said jaws to be spread apart in the soil, thereby creating a seed receiving pocket in the ground to receive said seed dropping by gravity through said tube and said member.

8. The hand operated seed planting device of claim 7 in which said collar defines axially extending slots, tab means on said body extending into said slots, and adjustable pin means extending across said slots at a plurality of selected positions along said slots to block movement of said tab means therepast to define the depth of insertion of said jaws.

9. The seed planting device of claim 7 in which said seed dispenser means comprises means in said tube defining a seed receiving opening therethrough, seed scoop means carried on the upper end of said tubular body in the interior of said hopper and in surrounding relation to said tube and opening upwardly into said hopper to receive a seed therefrom, said hopper movable axially along said body during movement to said lowered position to bring said seed scoop means into registration with said opening in said tube thereby presenting a seed in said scoop means to be discharged through said opening into said tube for said delivery by gravity.

10. The device of claim 7 further comprising a pair of fixed depending blade members on said body at the lower end thereof positioned on either side of said jaws.

11. The device of claim 7 further comprising adjustable means on said body to define the extent of upward sliding movement of said collar and thereby define the depth of penetration of said jaws.

12. A hand operated seed planting device, comprising a tubular body which is generally vertically oriented in use, a pair of soil spreading jaws pivotally mounted on a lower end of said body, a soil collar slidably mounted on said body at the lower end thereof in normally surrounding relation to said jaws and slidable thereon between a lowered position in which said jaws are received within said collar and an elevated position, said jaws being proportioned to extend through said collar into the ground at the lower end of said collar upon upward sliding movement of said collar on said body to said elevated position, hopper means carried on the upper end of said body including a hopper for retaining a plurality of seeds and a depending tube carried on said hopper within said body, said hopper and said depending tube being slidably movable on said body between a normally raised position and a lowered position, spring means in said body urging said hopper into said raised position, seed metering means cooperating between said hopper and said depending tube for dropping a seed through said tube from said hopper concurrently with movement of said hopper and said tube toward said lowered position, a jaw operating tubular sleeve member in said body at said lower end in generally axial alignment with said depending tube, said member having an exposed upper end engageable with said tube when said hopper and tube are moved into the lowered position thereof, and movable thereby, and cam means formed on an inside surface of said jaws, and roller means on said member coacting with said jaw cam means and responsive to said lowering movement for causing said jaws to be spread apart in the soil thereby creating a seed receiving pocket in the ground to receive said seed dropping by gravity through said tube and said member.

* * * * *